Figure 1:
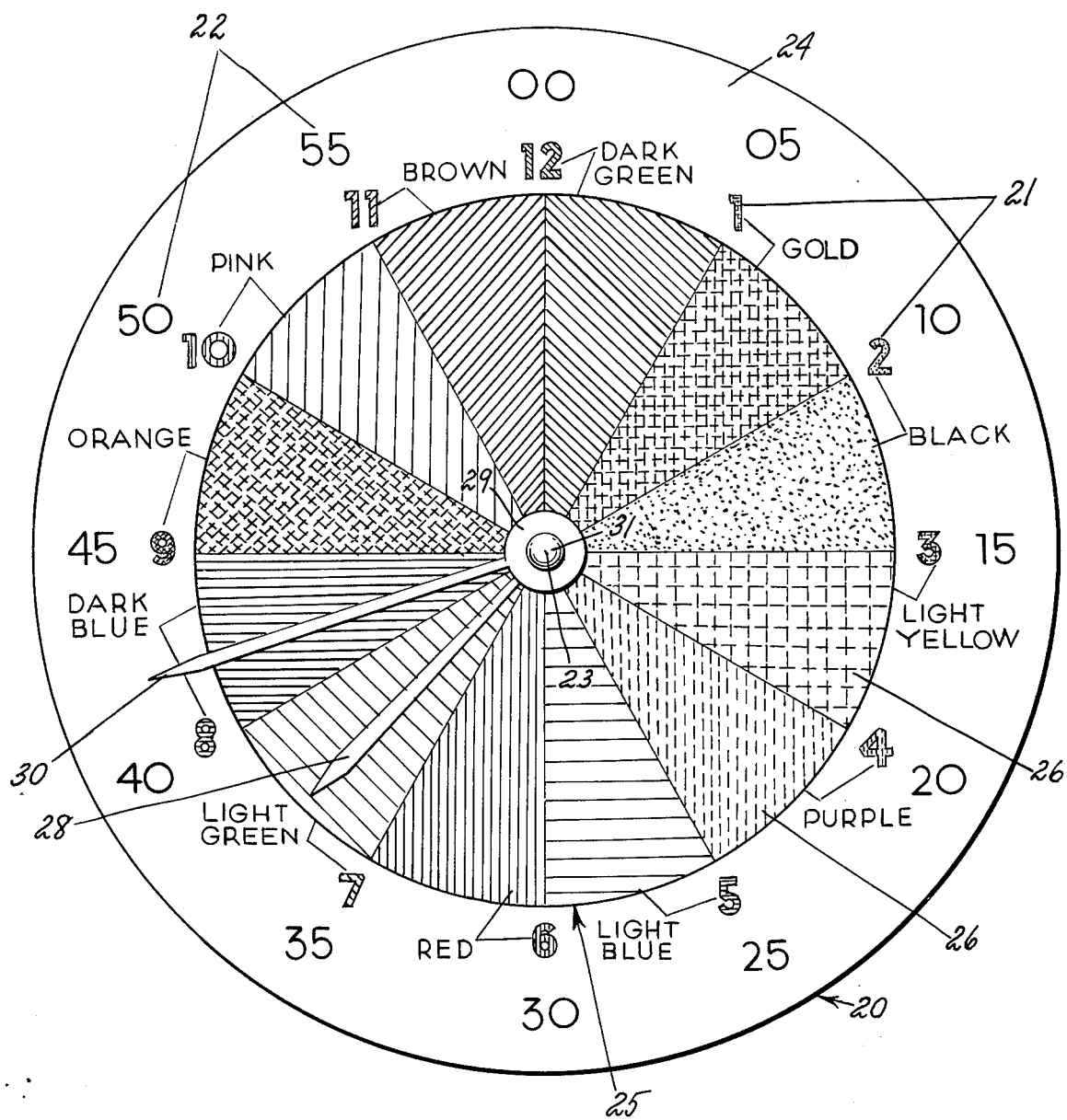

United States Patent [19]

Totten

[11] 4,124,945
[45] Nov. 14, 1978

[54] TIME TELLING TEACHING DEVICE

[76] Inventor: John Totten, 125 Eatons Neck Rd., Northport, N.Y. 11768

[21] Appl. No.: 770,622

[22] Filed: Feb. 22, 1977

[51] Int. Cl.² ............................................. G09B 19/12
[52] U.S. Cl. ...................................................... 35/39
[58] Field of Search ........................................... 35/39

[56] References Cited

U.S. PATENT DOCUMENTS

| | | | |
|---|---|---|---|
| 696,690 | 4/1902 | Murray | 35/39 |
| 2,994,970 | 8/1961 | Spooner | 35/39 |
| 2,997,794 | 8/1961 | Burr | 35/39 |
| 3,022,582 | 2/1962 | Pitt | 35/39 |
| 3,131,489 | 5/1964 | Alpert | 35/39 |
| 3,149,423 | 9/1964 | Naples | 35/39 |
| 3,608,214 | 9/1971 | Rancati | 35/39 |
| 3,670,428 | 6/1972 | Hall | 35/39 |
| 3,702,507 | 11/1972 | Romey | 35/39 |
| 3,967,389 | 7/1976 | Brooks | 35/39 |

FOREIGN PATENT DOCUMENTS

| | | | |
|---|---|---|---|
| 580,471 | 9/1946 | United Kingdom | 35/39 |
| 599,038 | 3/1948 | United Kingdom | 35/39 |

*Primary Examiner*—William H. Grieb

[57] ABSTRACT

This invention relates to a time telling teaching device in the form of a color coordinated clock face provided with two numerical scales circumferentially and concentrically disposed thereon in spaced relationshp to represent segments of time corresponding to the face of a clock, the inner scale being represented by the hour numerals 1 to 12, which are color coordinated to correspond to their respective 30° arc segments, the outer scale being represented by the minute numerals 00 to 55 in intervals of 5; respective hour and minute hands pivotally mounted on said clock face centrally of said numerical scales, said hour hand being of such a size as to lie within said colored arc segments, and said minute hand being of such length as to extend beyond the colored arc segments and up to the outer numerical scale.

8 Claims, 2 Drawing Figures

U.S. Patent  Nov. 14, 1978  4,124,945

TIME TELLING TEACHING DEVICE

This invention relates to a novel clock face useful as a teaching device which can also be used as the face of a standard clock or removably or permanently superimposed on the face of a standard clock.

The difficulties children encounter in telling time using the conventional clock faces are well known. Consequently, the prior art is replete with assorted educational devices designed to teach children to tell time. However, after having learned the art of telling time on said educational devices, it is often difficult for the child to transfer his acquired knowledge to the standard clock face. Many such devices divide the clock in half either with an imaginary or actual longitudinal line to teach the concept of minutes before the hour and minutes after the hour, the left side of the clock being distinguished from the right side either by color or shading as shown in U.S. Pat. Nos. 3,131,489 and 3,149,423, or by actually marking the left segment "until" and the right segment "after" as in Pat. No. 3,702,507. In lieu of or in addition to this artificial division between the left and right segments of a clock face, the minute numerals 1–30 are applied clockwise on the right side and counterclockwise on the left side as shown in U.S. Pat. Nos. 3,967,389, 3,149,423, 3,131,489 and 3,702,507.

Other time teaching devices utilize colored pegs to be inserted on a clock face to register the passage of minutes between adjacent hour numerals as shown in U.S. Pat. No. 3,022,582. A more complicated use of color coding is shown in U.S. Pat. No. 3,967,389 wherein five differently colored minute segments between two hour numerals are color coded with five equal segments on the clock face, each segment representing 12 minutes. Another use of color coding is shown in U.S. Pat. Nos. 2,997,794 and 3,702,507 wherein the hour hand is the same color as the hour numerals and the minute hand is associated colorwise with the minute indicia. Color coding is also shown in U.S. Pat. No. 3,608,214 wherein a disc having imprinted thereon 12 numerals of different colors is color coded with a plurality of sets of sectorial indicators which represent minutes and can be used to represent the number of minutes before or after a selected hour.

However, none of aforesaid devices have the advantages of the color coordinated clock face of present invention which facilitates the teaching of telling time and eliminates the confusion attendant the use of the expressions "before," "after," "quarter to," "quarter of," "half past," etc. In addition, the acquired knowledge using the teaching device of present invention can readily and easily be transferred to standard clock faces.

Accordingly, the time telling teaching device of instant invention, in general, is in the form of a color coordinated clock face provided with two numerical scales circumferentially and concentrically disposed thereon in spaced relationship to represent segments of time corresponding to the face of a clock, the inner scale being represented by the hour numerals 1 to 12, which are color coordinated to correspond to their respective 30° arc segments, the outer scale being represented by the minute numerals 00 to 55 in intervals of 5; respective hour and minute hands pivotally mounted on said clock face centrally of said numerical scales, said hour hand being of such a size as to lie within said colored arc segments, and said minute hand being of such length as to extend beyond the colored arc segments and up to the outer numerical scale.

More specifically instant invention provides a time telling teaching device which can also be substituted for the face of a standard clock which comprises a clock face having two numerical scales circumferentially and concentrically disposed thereon in spaced relationship to represent segments of time corresponding to the face of a clock, the inner scale being represented by differently colored hour numerals 1 to 12, the outer scale being represented by like colored minute numerals 00 to 55, the circular area encompassed by the inner scale being divided into twelve 30° arc segments color coordinated to correspond to the color of their respective hour numerals; and respective hour and minute hands pivotally mounted on said clock face centrally of said numerical scales, said hour hand being of such a size as to lie completely within the confines of said colored arc segments, and said minute hand being of such a size as to extend beyond said colored arc segments.

Therefore, it is a principal object of this invention to provide a visual time-telling teaching device which utilizes a color coordinated clock face to simplify the association of color with the hour numerals.

Another object of this invention is to provide two separate and distinct numerical scales for the hour numerals and the minute numerals.

Another object of this invention is to teach the child to read the time as on digital clocks and avoid the confusion in the use of common expressions such as "before," "after," "to," "of," "quarter past," "half past" and the like.

A further object of this invention is to provide a teaching device which is simple, efficient, durable, attractive and inexpensive to manufacture.

Another object of this invention is to provide a teaching device which can also be substituted for the clock face of a standard clock.

Still another object of this invention is to provide a teaching device which so closely resembles the standard clock face that the children readily and easily transfer his or her acquired reading ability to the standard clocks.

Figure 2:
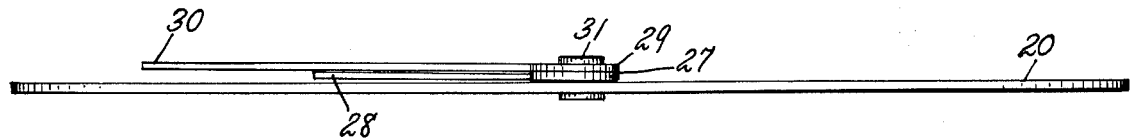

In accordance with the above objects and such other objects and features which will become apparant from the following specification, the invention will be understood from the accompanying drawings, wherein like characters designate like parts and wherein:

FIG. 1 is a plan view of the time-telling teaching device made in accordance with this invention; and FIG. 2 is a bottom view of FIG. 1.

Referring to the drawings in detail, the time-telling teaching device of this invention comprises a base plate 20 which may be round, square, hexagonal, oval, rectangular or of any desired shape and made of any suitable material such as plastic, paper on wood or metal backing, wood, metal or cardboard, of a desired thickness, having two numerical scales 21 and 22 circumferentially and concentrically disposed about pivot point 23 on clock face 24 in spaced relationship to represent segments of time, more specifically at five minute intervals, corresponding to the face of a clock. The inner scale 21 represents the hour numerals 1 to 12, each numeral differing from every other numeral by color. The outer scale represents the minute numerals from 00 to 5 minute intervals, all of said numerals being of the same color (for example black). The minute numerals may be of the same size as the hour numerals, but are preferably smaller in size.

The use of two separate numerical scales for hours and minutes eliminates the confusion caused by the use of the single numerical scale 1-12 on standard clocks which simultaneously represents both hours and minutes. This is a common problem encountered by children learning the art of telling time. The use of the two separate and different numerical scales eliminates the necessity of requiring the young child to multiply the hour numeral by 5 in order to calculate the number of minutes. For example, when the minute hand points to 7, and in the absence of the minute scale, the child must calculate the minutes by multiplying the 7 by 5. This presupposes that the child knows the 5 muliplication table, which very often is taught subsequent to teaching the art of time-telling.

The circular area 25 encompassed by the numerical hour scale 21 is subdivided into twelve 30° arc segments 26, herein referred to as "hour arcs," by means of dividing lines extending from each hour numeral to pivot point 23, each segment subsequent to the designated hour being color coordinated to correspond to the color of said hour numeral. This color coding allows for the continuous determination of the hour, regardless where the hour hand is situated within said hour arc. The use of the colored hour arcs as an indicator of the hour of the day in addition to the color coordinated hour numerals greatly simplifies the learning process for the young child involved in telling time.

The inner end 27 of hour hand 28 and the inner end 29 of minute hand 30 are rotatably secured to clock face 24 at pivot point 23 by any suitable securing means 31 such as a paper fastener, rivet, eyelet, pin or the like. Hour hand 28 and minute hand 30 is preferably independently rotatable but may also rotate as a unit in any preset position. Both the hour hand 28 and the minute hand 30 are of the same color, for example, black or white as in standard clocks, or in a color different from the colors of the hour arcs. The hour hand 28 is of such length as to be within the outer perifery of colored segments 26. The minute hand 30 is of such length as to extend beyond the outer perifery of colored segments 26 and beyond hour numerals 21, and up to minute numerals 22. The hour hand 28 and minute hand 30 may be made out of any suitable material similar to or different from base plate 20, and may be manually operated or may be mechanized by connection to a motor such as a clock mechanism.

No special teaching technique is needed when utilizing the device of this invention as is so often necessary with prior art time-telling devices. The child is able to easily and readily read the time by simply noting the color of the hour arc 26 within which the hour hand 28 is situated and relating it to the similarly colored hour numeral adjacent thereto in order to determine the hour of the day; and then noting the minute numeral to which the minute hand 30 is pointing to determine the time of day, which is read similarly to a digital clock. For example, when the hour hand is within the gold hour arc which is color coded to correspond to numeral 1, and the minute hand points to the numeral 40, the time can be simply read as 1:40, thereby eliminating any confusion with common expressions such as 20 minutes of two, half-past, quarter after, quarter of or to, and the like. All fractions of an hour are simply added to the predetermined hour of the day, and are added as they are written on the face of the clock (i.e. 1:40).

In addition, the fact that the hour numeral is situated at the intersection of two colors teaches the child that an hour is a period of time extending from one hour numeral to the next hour numeral which changes color to coincide with adjacent hour arc. Thus, when the hour hand is pointing to the 3 numeral and the minute hand is pointing to the 00 numeral, the time can be read as 3:00 (o'clock).

In contrast to prior art teaching devices, wherein the child must memorize certain phrases and/or be first taught to comprehend the passage of time by assorted indicators, which are subsequently removed after the child has committed said information to memory; instant device closely resembles a standard clock and enables the child to simply read the time in a sequential manner, first the hour and then the minute such as 4:30. The color coded hour arcs inherently teach the child the concept of the passage of time and the color coordinated hour numerals provide a ready and simple association therebetween. The use of two independent and differentiated numerical scales for the hours and the minutes eliminates the confusion caused by the use of a single numerical scale to simultaneously represent two different elements, hours and minutes.

Although specified colors have been shown in FIG. 1 of the drawing, other colors as well as a different sequence of colors may be used for the color coded clock face, provided each set of hour numeral and associated hour arc is distinct one from the other. In lieu of color differentiation as shown, other visual means such as differing textures or shadings may be utilized as a means of distinguishing each hour arc and related hour numeral from the others.

Although this invention has been described with reference to specific embodiments, it will be apparant to one skilled in the art that various modifications and equivalents may be made thereto which fall within the scope herein.

I claim:

1. A time telling teaching device which comprises a clock face having two separate numerical scales circumferentially and concentrically disposed thereon in spaced relationship to represent segments of time corresponding to the face of a clock, the inner scale being represented by differently colored hour numerals 1 to 12, the outer scale being represented by like colored minute numerals 00 to 55 in intervals of 5, the circular area encompassed by the inner scale being divided into twelve 30° colored arc segments each segment subsequent to the designated hour being color coordinated to correspond to the color of said respective hour numeral; and respective hour and minute hands pivotally mounted on said clock face centrally of said numerical scales, said hour hand being of such a size as to lie completely within the confines of said colored arc segments, and said minute hand being of such a size as to extend beyond said colored arc segments.

2. The device of claim 1, wherein the minute numerals are smaller in size than the hour numerals.

3. The device of claim 1, wherein the hour and minute hands respectively are independently rotatable.

4. The device of claim 1, wherein the hour and minute hands are the same color.

5. The device of claim 4, wherein the hour and minute hands are of a different color than the arc segments.

6. The device of claim 1, wherein the minute hand extends beyond the hour numerals and up to the minute numerals.

7. The device of claim 1, wherein the time is read in the same terms as on digital clocks.

8. The device of claim 1, wherein the minute numerals and the hour numerals are the same size.

* * * * *